Figure 6:
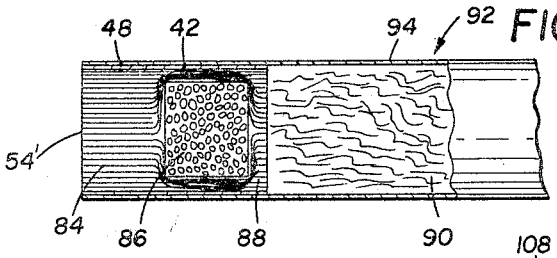
Figure 7:
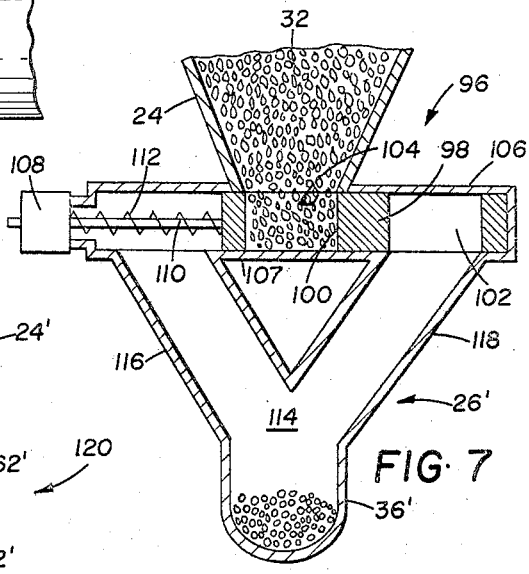
Figure 8:
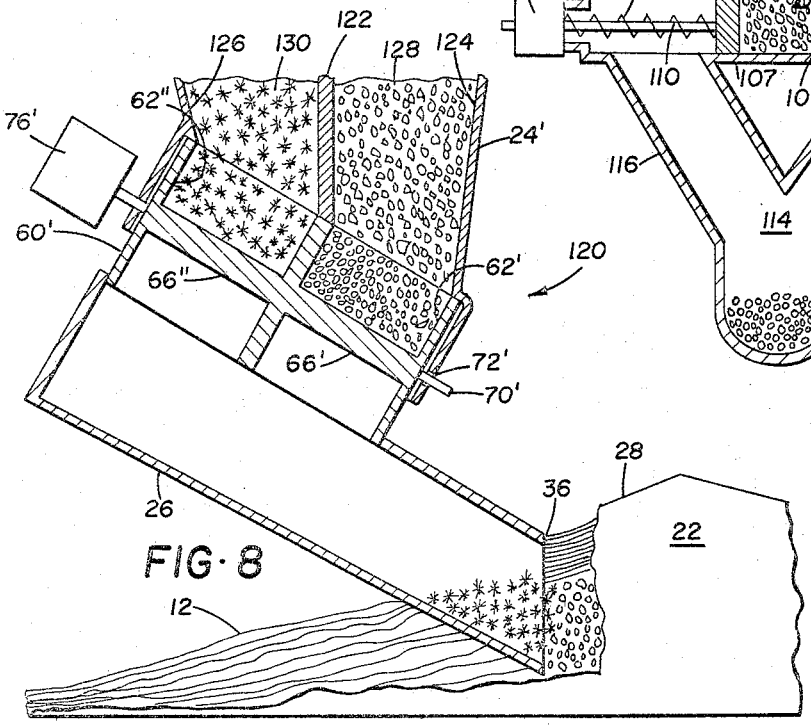
Figure 9:
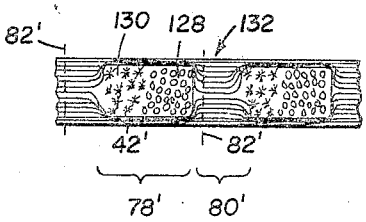
Figure 11:
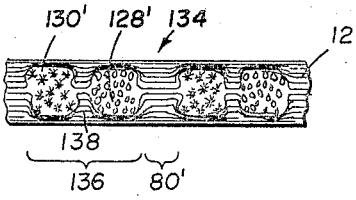
Figure 10:
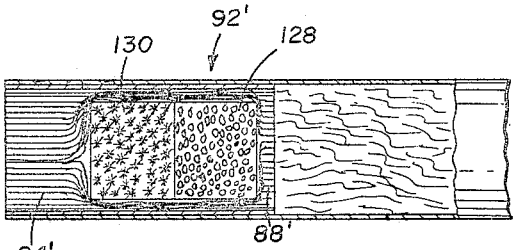

T860,013

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 25, 1969

860 O.G. 1007

775,576

APPLICATION OF ADDITIVES AS CORES IN CIGARETTE FILTERS

Roy E. Hawkins and Tom B. Ritchie, Kingsport, Tenn., assignors to Eastman Kodak Company, Rochester, N.Y., a corporation of New Jersey

Continuation of application Ser. No. 489,331, Sept. 22, 1965. This application Oct. 23, 1968. Published Mar. 25, 1969

Class 156—180

2 Sheets Drawing. 17 Pages Specification

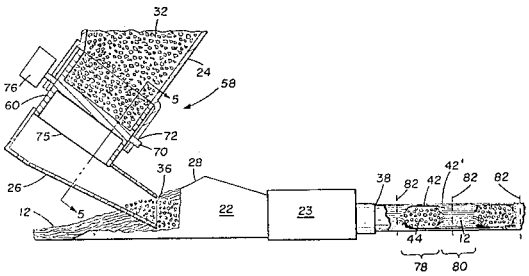

An apparatus and method for making fibrous tobacco smoke filters having finely divided additive cores, including spreading a continuous fibrous tow into a ribbon-like band which is shaped into a U-shape form capable of retaining finely divided additive material deposited through a hopper and funnel arrangement. Thereafter the tow is gathered and compressed into a rod having a longitudinal core of additive material. The additive hopper may include a valve adapted to deposit predetermined amounts of additive material at predetermined time intervals.

T860,013
SN - 775576
DEF. PUB.
March 25, 1969 R. E. HAWKINS ET AL
APPLICATION OF ADDITIVES AS CORES IN CIGARETTE FILTERS
Original Filed Sept. 22, 1965 Sheet 1 of 2
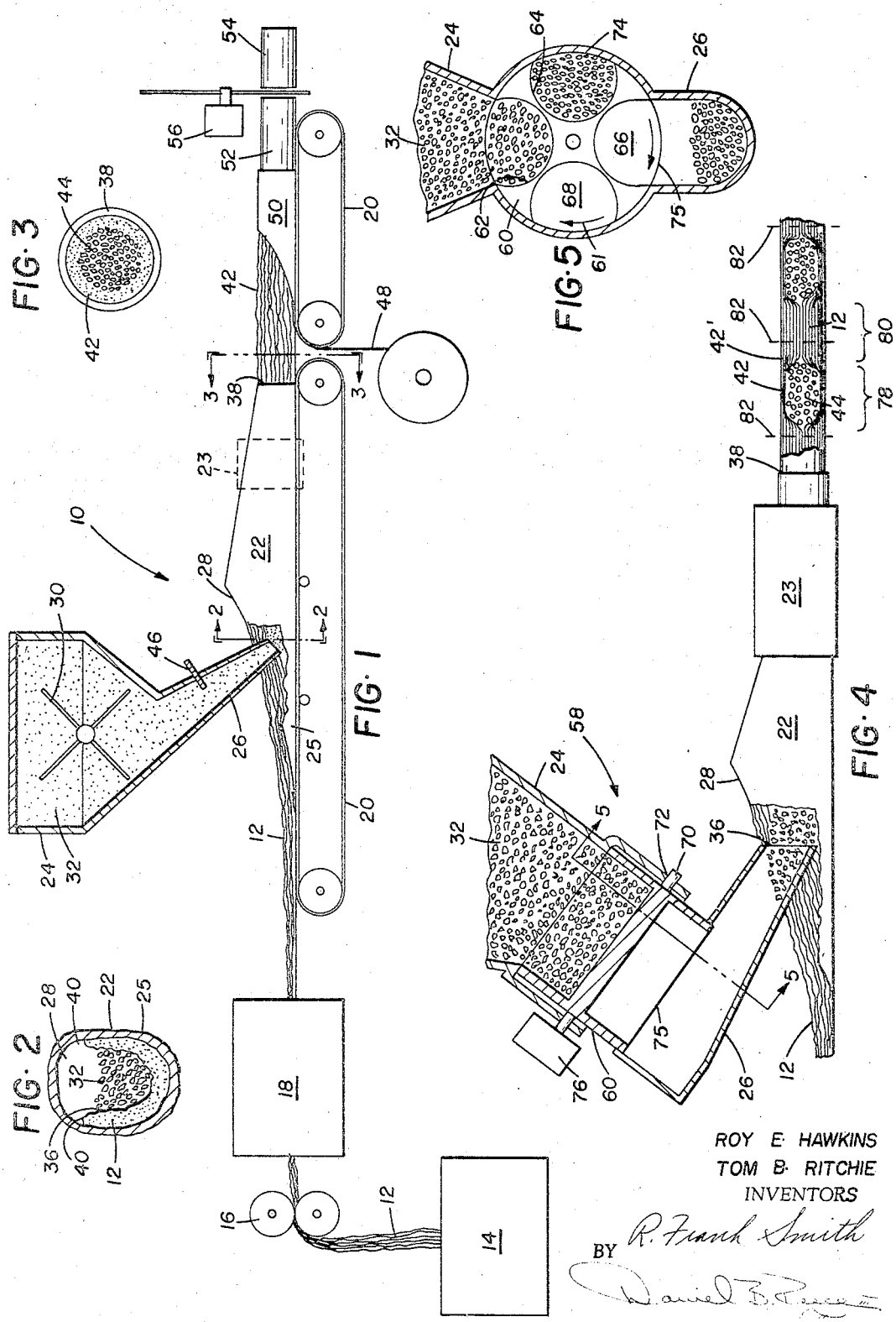
ROY E. HAWKINS
TOM B. RITCHIE
INVENTORS
BY R. Frank Smith
Daniel B. Powell
ATTORNEYS

T860,013

SN - 775576
DEF. PUB.

March 25, 1969 R. E. HAWKINS ET AL

APPLICATION OF ADDITIVES AS CORES IN CIGARETTE FILTERS

Original Filed Sept. 22, 1965 Sheet 2 of 2

ROY E. HAWKINS
TOM B. RITCHIE
INVENTORS

BY R. Frank Smith

Donald B. Tuttle

ATTORNEYS